United States Patent [19]

Komendat et al.

[11] 3,769,147
[45] Oct. 30, 1973

[54] TEMPORARY SUPPORT FOR WEBBED MATERIAL

[75] Inventors: David T. Komendat; Charles F. Reed, both of Painesville, Ohio

[73] Assignee: Avery Products Corporation, San Marino, Calif.

[22] Filed: Aug. 11, 1970

[21] Appl. No.: 62,886

[52] U.S. Cl.................. 161/82, 117/48, 156/249, 161/216, 161/251, 161/406, 206/56 A, 206/56 AB
[51] Int. Cl.......................... B32b 5/02, B32b 27/30
[58] Field of Search ..................... 206/56 A, 56 AB; 161/216, 82, 406; 117/48; 156/249, 251

[56] References Cited
UNITED STATES PATENTS

| | | | |
|---|---|---|---|
| 2,596,179 | 5/1952 | Seymour | 206/56 AB |
| 3,420,364 | 1/1969 | Kennedy | 206/56 AB |
| 3,475,267 | 10/1969 | Miles | 161/250 X |
| 2,631,957 | 3/1953 | Francis, Jr. | 161/406 X |
| 1,101,178 | 6/1914 | Haigh | 117/48 |
| 2,780,574 | 2/1957 | Ott et al. | 156/249 X |
| 2,842,473 | 7/1958 | Oberly et al. | 156/249 X |
| 3,434,904 | 3/1969 | Wiggins | 161/406 X |
| 3,519,525 | 7/1970 | Jackstadt | 161/406 X |

FOREIGN PATENTS OR APPLICATIONS

| | | | |
|---|---|---|---|
| 563,020 | 9/1958 | Canada | 161/82 |
| 1,033,521 | 6/1966 | Great Britain | 161/250 |

Primary Examiner—Alfred L. Leavitt
Assistant Examiner—C. B. Cosby
Attorney—McNenny, Farrington, Pearne and Gordon

[57] ABSTRACT

A temporary support for web materials is disclosed. Such support is normally provided to permit convenient handling or processing of a web. For example, webs that are so limp, fragile, subject to distortion, or otherwise mutable as to prevent them from being handled by normal handling and processing equipment are stabilized by a temporary support so that they may later be either restabilized by other means (such as a permanent backing web) before or at removal of the temporary support, or destabilized by removal of the temporary support. In other instances, relative stable articles such as labels, tags or the like may be temporarily supported for printing or other processing operations and subsequently removed for use. The temporary support includes a temporarily adherent web-contacting layer adapted to provide a temporary non-chemical bond with the web, and may also include a dimensionally stable base such as paper. The web-contacting layer may be directly bonded to the base or may be indirectly bonded thereto as by the use of an intermediate layer of pressure-sensitive adhesive. The web may be laminated to the temporarily adherent layer by heat and pressure and, after processing and handling, may be delaminated therefrom without residue by applying diverging forces.

10 Claims, 6 Drawing Figures

INVENTORS
DAVE T. KOMENDAT,
& CHARLES F. REED
BY
MCNENNY, FARRINGTON, PEARNE & GORDON
ATTORNEYS

TEMPORARY SUPPORT FOR WEBBED MATERIAL

BACKGROUND OF THE INVENTION

This application is a continuation-in-part of our co-pending application, U.S. Ser. No. 773,517, filed Nov. 5, 1968 now abandoned.

This invention relates generally to the processing and handling of web material and more particularly to a novel and improved temporary support for web material and to a novel and improved method for applying and removing such temporary support.

The handling and processing of many web materials is difficult because the material is limp, fragile, deformable, or has other physical properties which prevent it from being handled conveniently by typical web-handling equipment. For example, it is often desired to print a fabric or other type of web material with a printing apparatus which requires sheet feeding. If the fabric or web to be printed is sufficiently limp, the sheet feeding of the material is impractical with conventional equipment. In accordance with the present invention, the fabric or other web material may be temporarily laminated to a support which provides sufficient stiffness to permit the laminated fabric or other web material to be sheet fed by conventional sheet-feeding equipment.

In other instances it may be desired to print, slit, blank out, overlaminate, cut, rewind, dispense, or the like, a web material which is so fragile that it ruptures or tears if it is processed by conventional equipment. In such instances the fragile web material may be laminated to a temporary support in accordance with this invention so that it may be processed by conventional means without damage.

In still other instances, it may be desired to process or handle a web material in a manner which would normally produce an undesired elastic or nonelastic distortion due to the loads imposed upon the web material by the processing or handling equipment. Here again, such web material may be temporarily laminated to a support structure in accordance with the present invention to permit the handling or processing of the material without distortion.

In each of the above instances, and in other similar instances, the web material may be laminated to the temporary support in accordance with this invention so that the laminated structure provides sufficient dimensional stability to permit it to be handled or processed in the desired manner. After processing or handling the temporary support and the web material may be easily delaminated. After delamination, as by stripping the web and temperature support apart, there is little or no residual material remaining on the web as a result of the lamination thereof with the temporary support.

The temporary support is, in such instance, intended primarily for handling or processing web materials which are otherwise unwantedly mutable. Such unwanted mutability may involve temporary change (e.g., the dropping of a limp web or the elastic deformation of a web), or permanent change (e.g., the tearing or plastic stretching of a weak web), or a combination of both temporary and permanent change. As hereinafter used, the terms "mutable web material" or "mutable web" are intended to include various types of web materials or webs which are sufficiently limp, fragile, dimensionally unstable, or otherwise subject to distortion or degradation when handled or processed in the unsupported state to prevent their satisfactory handling or processing. Such web materials may be fabrics, foils, plastics, or any other materials presenting difficulties of the above nature.

In accordance with another aspect of this invention, a temporary support is provided for labels or tabs. While supported, such labels or tags may be processed for example by printing, and then delaminated for use. The Kennedy U.S. Pat. No. 3,420,364 describes one arrangement for temporarily supporting tags of the like. However, the structure of Kennedy requires the use of a release coating in combination with one or more other coatings to provide for the temporary lamination of the tags with a support or backing.

SUMMARY OF THE INVENTION

In accordance with one aspect of the present invention, a temporary support of a mutable web is provided by laminating the web to a heat-softening surface carried by a backing sheet or web which provides sufficient dimensional stability to the mutable web to permit it to be handled or processed in the desired manner. The heat-softening material which provides the bond between the mutable web and the temporary support is arranged to permit easy stripping of the mutable web from the temporary support without damaging the mutable web and without leaving any residual manner on the mutable web.

In accordance with another aspect of this invention, temporary support may be provided for paper tags or the like. For example, paper stock for tags may be laminated with heat and pressure to a heat-softened bonding support which is nontacky at normal ambient temperatures. The tag stock is then cut without cutting the backing sheet. The portion of the tag stock between the tags is then removed leaving only the tags bonded to the backing sheet. Since the bonding surface is nontacky, the laminate can be processed in any desired manner and the tags can be subsequently removed. After removal the tags are free of coatings and the entire bonding surface coating remains on the backing.

The heat-softening material is a material of the type which forms a relatively weak mechanical bond (as distinct from a chemical bond) with the web material by permitting slight embedment of the web material into the surface of the heat-softening layer. Generally, the heat-softening layer should be chemically inert so that it does not form a chemical bond with the web, be highly cohesive so that it will strip away from such web without residue, and should be a material which softens and flows at a temperature and pressure which permits the lamination of the temporary support with the web without damage to the latter.

One heat-softening material which has been found satisfactory for use in accordance with this invention is polyethylene film supported by tag stock paper or the like. The film may be applied directly to the paper or may be laminated therewith by an adhesive such as a pressure-sensitive adhesive. The surface of the polyethylene film softens when subjected to heat and provides a sufficiently strong mechanical bond with most webs to provide the necessary support for the web during normal processing and handling operations. However, it has been found that the mechanical bond formed in this manner may be broken with sufficient ease to prevent damage to even a mutable web without the use of release coatings or the like. Therefore, after separation from the temporary support, the web material is completely free of residual materials from the temporary support.

In another embodiment the wire side of 40-pound white bleached kraft paper is Gravure coated with a solution of a copolymer of vinylidene chloride and a small amount of vinyl chloride and is dried to form a coating of about one-half mil to one mil in thickness. Such material is marketed by The Dow Chemical Company under the name Saran. The Saran surface is then bonded to the uncoated side of tag stock paper with heat and pressure. This forms a weak mechanical bond with the fibers of the tag stock which can be easily broken when desired and the tag stock after delamination is free of any coating from the temporary support. In some instances other thermoplastic coatings such as a wax coating or the like may be used instead of a polyethylene film or a Saran coating.

OBJECTS OF THE INVENTION

It is an important object of this invention to provide a novel and improved temporary support for mutable web material and to provide a novel and improved method for laminating and delaminating such temporary support and mutable web, nonmutable webs, or nonadhesive tags or labels.

DETAILED DESCRIPTION OF THE DRAWINGS

Figure 1:
FIG. 1 is a side elevation of one form of temporary support in accordance with this invention laminated to a mutable web and illustrating partial separation or delamination of the mutable web and the temporary support.

Referring to FIG. 1, 10 designates a web of mutable material which may be a fabric, foil, plastic, or any other material which cannot be handled or processed in the desired manner. The mutable web is bonded to a heat-softening material 11 which may be, for example, polyethylene. The third layer of the laminated assembly is a base layer 12 which may be any material which provides sufficient stability to permit the processing or handling of the mutable web 10. For example, the base 12 may be a 100-pound tag stock paper or the like. In most cases the temporary support should be flexible so that it can be fed around rolls or the like.

In the embodiment of FIG. 1, the heat-softening material 11 is directly bonded to the base 12 at an interface 13 without the use of a separate layer of adhesive or the like. Similarly, the heat-softening material 11 is directly bonded to the mutable web 10 at an interface 14 without the use of separate adhesive or separation coatings. This structure of FIG. 1 is satisfactory for use in laminates wherein the natural strength of the mechanical bond between the heat-softening material 11 and the mutable web 10 is less than the strength of the bond between the heat-softening material 11 and the base 12.

An example of such a structure is a laminate of thin aluminum foil or the like having a thickness in the order of two mils, the heat-softening layer 11 formed of polyethylene having a thickness in the order to 2 to 4 mils, and a base layer formed of 100-pound weight tag stock paper having a thickness in the order of seven and one-half mils wherein the three materials forming the laminate are laminated at temperatures of between 150°F. and 350°F. Because the tag stock paper has a relatively rough or porous surface compared to the extremely smooth surface of aluminum foil, the bond of the heat-softening polyethylene layer 11 between such layer and the base 12 is much stronger than the bond between the heat-softening layer and the foil.

After handling or processing, the foil can be easily stripped from the temporary support base and the separation will occur along the interface 14 as illustrated at the left end of FIG. 1. It should further be noted that the separation occurs with no residual polyethylene remaining on the surface of the foil.

The stripping is accomplished by merely applying diverging forces to the mutable material and the temporary support base. If a typical adhesive were used with a release coating to reduce the strength of the bond between the adhesive and the mutable web, there would tend to be residual material left on the web. However, with this invention no such residual material exists because the cohesion of the heat-softening layer 11 is greater than the bond between the heat-softening layer 11 and the web 10, and the adhesion between the heat-softening layer 11 and the base 12 is substantially stronger than the adhesion at the interface 14.

Figure 2:
FIG. 2 is a side elevation of a second embodiment in accordance with this invention wherein a heat-softening material is laminated to the support base by a layer of adhesive.

FIG. 2 illustrates an embodiment wherein the heat-softening layer is laminated to the base by an adhesive layer. In this embodiment, the heat-softening layer 16 again may be polyethylene film or the like, preferably having a thickness in the order of 2 to 4 mils. The layer 16 is adhesively bonded to a base layer 17 by an intermediate layer 18 of adhesive. The adhesive layer 18 may be of any suitable type, but a layer of pressure-sensitive adhesive that form a strong bond with the layer 16 and has a thickness in the order of 4 mils has been found to function satisfactorily. Here again, the base may be of any suitable material such as 100-pound tag stock paper.

In this embodiment the mutable web 19 is again temporarily bonded by heat to the heat-softening layer 16. The structure is arranged so that the bond at the interface 21 between the mutable web 19 and the heat-softening layer 16 is weaker than the bond provided by the adhesive layer 18 with both the heat-softening layer 16 and the base 17. Similarly, the cohesion of the heat-softening layer 16 and the adhesive 18 is greater than the adhesive bond at the interface 21. With these relationships, the mutable web 19 may be stripped away from the temporary base along the interface 21 after the required handling or processing. Here again, there is no release coating or the like at the interface 21 so no residual material remains on the web 19 after stripping.

Figure 3:
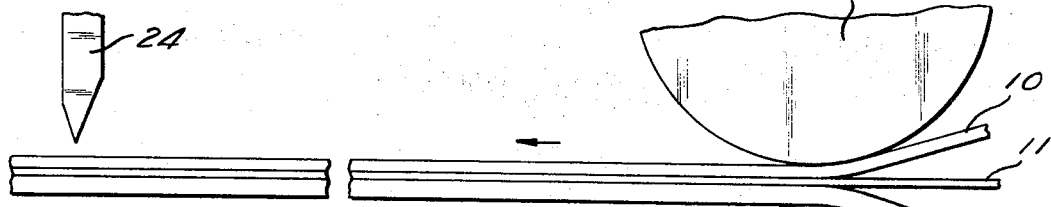
FIG. 3 is a schematic illustration of one method and apparatus which may be used to form a laminate of the type illustrated in FIG. 1 wherein the heat-softening material, the support base, and the mutable web are simultaneously laminated.

FIG. 3 illustrates schematically one method and apparatus for temporarily laminating a mutable web to a temporary support. This method and apparatus may be used with the embodiment of FIG. 1 when a film of heat-softening material 11 is laminated to a mutable web 10 at the same time it is laminated to the base 12. The lamination occurs simultaneously by feeding the three materials between heated laminating rolls 22 and 23. Preferably, one of the rolls 22 or 23 is a hard-chromed steel roller heated by oil, steam, electricity, or other heating means while the other roll is formed of natural cured neoprene rubber with a durometer of about 80 Shore.

A laminating pressure is applied by the rolls which is normally between about 80 and 150 pounds per square inch, depending upon the surface and texture of the material being laminated. The laminating temperature is maintained low enough to prevent damage to the mutable web 10. It has been found that in most instances satisfactory lamination can be obtained with a laminating temperature of between 150°F. and 350°F. Of course, the specific heating of the laminate is a function of speed as well as temperature. Specific fabrics, foils, or films may require a specific temperature for proper bonding. It is important that a fabric, foil, or film stock be heated to the specific temperature required to obtain the desired bond.

Generally speaking, if a bond at the interface 14 is too strong, lower temperatures, higher speeds, and/or lower pressures may be utilized to reduce the strength of the bond. Conversely, if a greater bond strength is required, higher temperatures, lower speeds, and/or higher pressures may be utilized to increase the strength of the bond. The bond strength required must be sufficiently strong to maintain lamination during the required processing and feeding operations to be performed on the supported web, but must also be sufficiently weak to permit stripping of the web from the temporary support without damage after the processing and handling operations are completed. In FIG. 3 a knife 24 is schematically illustrated. Such a knife may be used to cut the temporarily supported web into sheets or may constitute part of the handling or processing mechanism.

Figure 4:
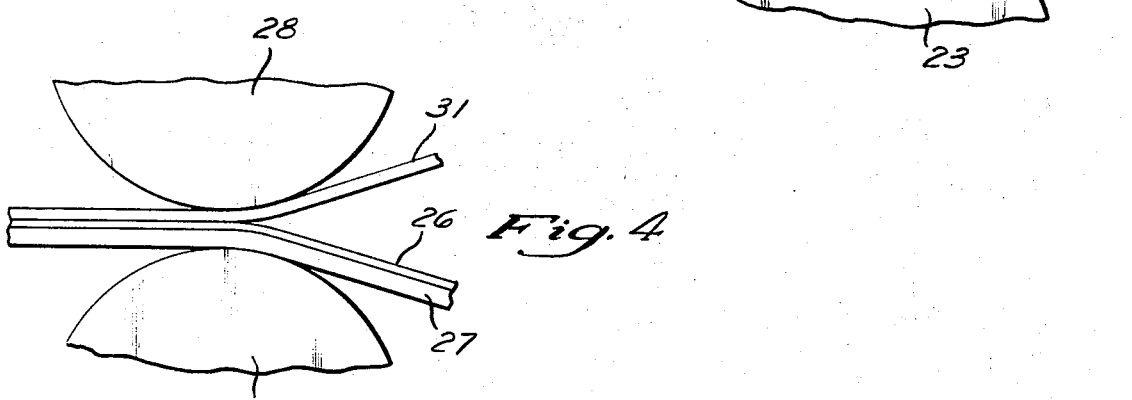
FIG. 4 is a schematic illustration of a method and apparatus for laminating a mutable web to a temporary support wherein the heat softening material is laminated to the base prior to the step of laminating the temporary support to the mutable web.

Referring to FIG. 4, in some instances the heat-softening layer is applied to the base prior to the lamination of the heat-softening layer and the mutable web. This method and apparatus may be used when a heat-softening layer 26 such as polyethylene is coated on a base 27 such as tag stock and subsequently the laminate of the two layers 26 and 27 is passed between laminating rolls 28 and 29 along with a mutable web 31 to form the required bond therebetween. Such a method and apparatus is preferred when the surface characteristics of the base 27 and the mutable web 31 are such that the required difference in strength between the bond at the interface between the web 31 and the layer 26, and the bond between the layer 26 and the base 27 cannot be obtained by simultaneous lamination. For example, the surface characteristics of a fabric mutable web may be such that the bond, if simultaneously formed as in FIG. 3, would be substantially the same between the layer 26 and both the base 27 and the web 31. In such a case the previously established bond between the base 27 and the heat-softening layer 26 can be established with higher heat and pressure than is used between the laminating rolls 28 and 29. Similarly, if desired, a pressure-sensitive adhesive layer having a higher bonding or adhesion characteristic can be used to laminate the heat-softening layer 26 and the base 27 so that the heat and pressure of the rolls 28 and 29 can be regulated to produce the desired bond strength at the interface between the heat-softening layer 26 and the mutable unstable web without adversely affecting the bond between the heat-softening layer 26 and the base web 27. Still further, in some instances the heat-softening layer 26 may be applied to the base 27 as a very thin coating of a thickness of about 0.0005 inches to 0.0015 inches. Such a coating tends to provide a relatively strong adhesive bond.

Figure 5:
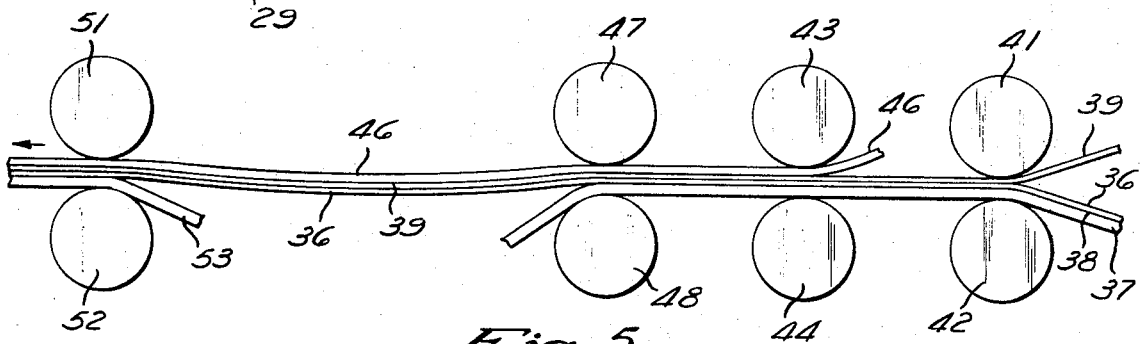
FIG. 5 is a schematic illustration of a method and apparatus for providing a temporary support for a mutable material which tends to change dimension when heated.

In some instances, for example when the mutable web tends to shrink when subjected to heat, a method and apparatus as illustrated in FIG. 5 may be utilized. In this embodiment a pressure-sensitive adhesive layer 36 is laminated with a temporary base 37 and is arranged so that a weak bond is established at the interface 38 therebetween. Such a weak bond may be established by the use of a separation coating such as a silicone coating or the like. The laminated layers 36 and 37 are then passed along with a heat-softened layer 39 between laminating rolls 41 and 42 to form a laminate consisting of the layers 36, 37, and 39. This laminate is then passed between heated laminating rolls 43 and 44 which laminate a mutable web 46 to the heat softening layer 39. The laminate is then passed through rolls 47 and 48 wherein the base layer 37 is delaminated from the adhesive layer 36 by applying a diverging force. This can easily be accomplished because the bond at the interface 38 is very weak.

The laminate consisting of the mutable web 46, the heat-softening layer 38, and the adhesive 36 is then normalized to relieve strain by loosely passing it between the rolls 47 and 48 and final laminating rolls 51 and 52. The speed of the rolls is controlled so that the normalizing span is loose and the mutable web 46 shrinks freely to a substantially unstressed condition. A second base 53 is then laminated to the adhesive layer 36 to complete the temporary support. Since a separation coating is not applied between the adhesive layer 36 and the second base 53, a bond therebetween is substantially stronger than the bond at the interface between the mutable web 46 and the heat-softening layer. Therefore, the mutable web can subsequently be stripped free of the temporary support in the manner described above. The method and apparatus of FIG. 5, therefore, relieves strain which would otherwise be present in the mutable web as a result of the heating at the laminating rolls 43. Such normalizing prevents the tendency to wrinkle and improves product uniformity.

Figure 6:
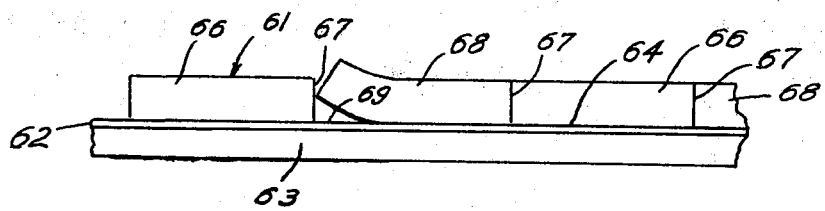
FIG. 6 is a side elevation of another embodiment in which tags are temporarily supported on a Saran coating.

FIG. 6, in which the vertical dimensions are greatly exaggerated, illustrates an embodiment of this invention wherein the temporary support web is not mutable. In this embodiment, a tag stock paper 61 is bonded with heat and pressure to a coating of a copolymer of vinylidene chloride and vinyl chloride (Saran) 62. The coating 62 is preferably applied to a backing layer 63 prior to the bonding with the tag stock 61. One procedure for applying the coating is to solution coat the backing 63 with a Gravure cylinder so that the amount of coating solution can be accurately controlled. The coating is then dried and has a thickness preferably about one-half mil to 1 mil. In order to minimize the absorption of the coating 62 and to obtain the maximum thickness of coating for a given amount of coating material, the coating is preferably applied to the wire side of the backing when a white bleached kraft paper, for example 40-pound stock, is used for the backing 63.

After drying, the coated backing is laminated with the tag stock 61 with heat and pressure substantially as illustrated in FIG. 4. If the tag stock is provided with a filler coating to improve its printability or the like, the lamination is preferably to the uncoated side so that the bond along the interface 64 will not be too strong.

In the subsequent processing the laminate may be die cut to form separate tags 66. Such die cutting is arranged so that only the tag stock is cut, for example along the lines 67, and the backing 63 remains uncut. The portions 68 of the tag stock between the tags 66 can then be stripped away leaving only the spaced tags 66 bonded to the backing 63. The surface 69 of the coating 62, which is uncovered when the portions 68 are stripped away, is not tacky. Therefore, the backing and tags 66 can be easily processed in any desired manner. The tags 66 can subsequently be removed from the backing and when removed, are free of any deposits or residual material from the temporary support backing.

Here again, the material forming the coating is a type which, when activated by heat, forms a mechanical bond with the supported web 61 which can be broken when the web is separated from the support backing. The coating material 62 has sufficient cohesion to prevent any residual material from remaining on the supported web 61 and the adhesion between the coating 62 and the backing 63 is substantially stronger than the bond between the coating 62 and the web 61. With this structure a simple, single coating is all that is required to provide the temporary bond with the temporarily supported web 61.

Although preferred embodiments of this invention are illustrated, it is to be understood that various modifications and rearrangements may be resorted to without departing from the scope of the invention disclosed and claimed herein.

What is claimed is:

1. A temporary laminate adapted for processing and handling operations such as decorating, cutting, blanking out, overlaminating, sheeting, slitting, rewinding dispensing, printing, or the like, comprising a base layer, a heat activable layer bonded on one surface to said base layer, the other surface of said activable layer being non-tacky and non-pressure sensitive under normal processing conditions, and a web directly and temporarily bonded with heat to said other surface of said activable layer without substantial impregnation while said activable layer is heated and thereby activated, said bond between said activable layer and said web remaining after said activable layer cools to normal processing condition and becomes non-tacky and non-pressure sensitive, said web when unsupported by said base layer being unsuitable for said processing operations due to its size, shape or mutability and when supported by said base layer being suitable for said processing operations, the strength of the bond between said activable layer and said base layer being substantially greater than the strength of the bond between said activable layer and said web, and the cohesion of said activable layer being greater than the adhesion between said activable layer and said web, the strength of said web being sufficiently great so that it is strippable from said activable layer after processing operations with the separation occurring at the interface therebetween, after stripping said web being free of the material of said activable layer and the exposed surface of said activable layer being non-tacky and non-pressure sensitive.

2. A temporary laminate as set forth in claim 1 wherein said web is mutable, and said heat activable layer softens at a laminating temperature between 150°F. and 350°F.

3. A temporary laminate as set forth in claim 2 wherein said heat activable layer is polyethylene.

4. A temporary laminate as set forth in claim 2 wherein said base is paper.

5. A temporary laminate as set forth in claim 4 wherein said heat activable layer is bonded to said base by a layer of adhesive material.

6. A temporary laminate as set forth in claim 1 wherein said heat activable layer is bonded to said base by a layer of adhesive material.

7. A temporary laminate as set forth in claim 2 wherein said web tends to shrink when subjected to heat, and wherein the stresses in said web are normalized while it is unsupported by said base layer so that said web is substantially free of internal stress.

8. A temporary laminate as set forth in claim 1 wherein said web includes a plurality of separate and spaced pieces of web material all bonded to said agent activable layer.

9. A temporary laminate as set forth in claim 8 wherein said heat activable material is a copolymer of vinylidene chloride and vinyl chloride.

10. A temporary laminate as set forth in claim 1 wherein said activable layer is bonded directly to said base layer.

* * * * *

UNITED STATES PATENT OFFICE
CERTIFICATE OF CORRECTION

Patent No. 3,769,147         Dated October 30, 1973

Inventor(s) David T. Komendat and Charles F. Reed

It is certified that error appears in the above-identified patent and that said Letters Patent are hereby corrected as shown below:

Column 1, line 53, change "temperature" to --temporary--.

Column 2, line 7, change "tabs" to --tags--.

Column 2, line 28, change "manner" to --matter--.

Column 2, line 34, change "support" to --surface--.

Column 4, line 55, change "form" to --forms--.

Column 5, line 50, change "web" to --webs--.

Column 6, line 41, change the numeral "38" to the numeral --39--.

Claim 8, column 8, line 46, change "agent" to --heat--.

Signed and sealed this 2nd day of April 1974.

(SEAL)
Attest:

EDWARD M. FLETCHER, JR.
Attesting Officer

C. MARSHALL DANN
Commissioner of Patents